DATA SIGNAL CHECKING MEANS
Original Filed July 18, 1958
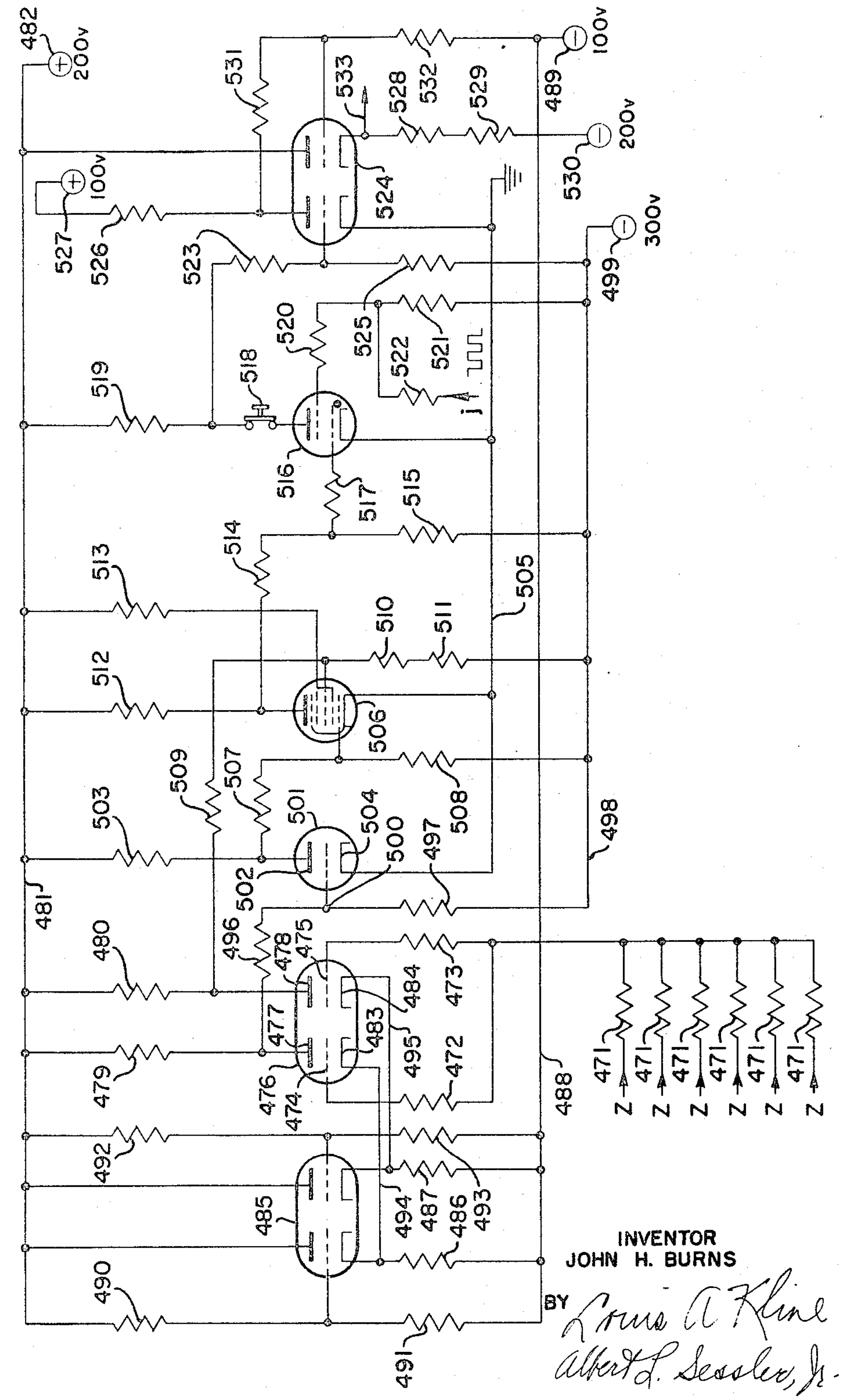
INVENTOR
JOHN H. BURNS
BY Louis A Kline
Albert L. Sessler, Jr.
HIS ATTORNEYS 3,331,052

DATA SIGNAL CHECKING MEANS

John H. Burns, Dayton, Ohio, assignor to The National Cash Register Company, Dayton, Ohio, a corporation of Maryland Original application July 18, 1958, Ser. No. 749,537, now Patent No. 3,157,867, dated Nov. 17, 1964. Divided and this application Mar. 16, 1964, Ser. No. 352,188
5 Claims. (Cl. 340—146.1)

ABSTRACT OF THE DISCLOSURE

A data signal checking circuit for checking the number of data bit signals generated by record media sensing circuits at any given position of the record media. A resistance network is utilized to mix the data bit signals and provide a resultant voltage level to the control electrodes of two signal translating devices, each of which cooperates in the control of a gating device, to produce a signal which is combined with a timing pulse in a further gating device to produce an error signal in the event that an incorrect number of data bit signals have been simultaneously applied to the checking circuit.

The present invention relates generally to high-speed record tape handlers, and more particularly to data signal checking means adapted for use with a tape-passing mechanism.

This application is a division of United States patent application Ser. No. 749,537, filed July 18, 1958, now U.S. Patent No. 3,157,867, by the same inventor.

The record tape may be produced by a tape perforator or as a by-product of the operation of a business machine. In the latter case, the tape is encoded with information indicative of business transactions, and ordinarily, at the close of the business day the tapes are gathered from the various machines for processing at a central station. The central station includes a utilizing device such as a tape-to-card converter or a computer for assimilating the large amount of tape-carried information for sorting and/or storage. The computer then becomes a source of information for inventory purposes, merchandising, cost control, or other analyses.

Computer time is valuable whether on a leased or owned basis, so it is highly desirable that the tape information be "read" into the computer at a high rate. The computer generally accepts the input data in discrete portions, commonly known as frames, which frames are terminated by tape-carried end-of-frame signals. Each frame may represent a complete business transaction, successive frames being of the same or different lengths, as determined by the amount of information comprised in a transaction. The information is stored on the tape in the form of punched holes, different combinations of the holes signifying different digits or characters. Illustratively, a paper tape employing a two-of-six code will be used in the ensuing description. The invention in principle, however, it applicable to the handling of other types of record tapes, such as magnetic tape, encoded as desired. A two-of-six code requires six separate channels longitudinally of the tape. A signal indicative of any digit or character then is denoted by the presence of two holes, located in different channels in transverse alinement with respect to the tape length. By way of nomenclature, a single hole is indicative of a bit, and the electrical variation produced therefrom is a bit output. The end-of-frame signal may be a particular combination of two holes in the manner of the digits.

Means are provided in the present invention for checking the number of data bit signals generated by the various data reading circuits corresponding to the data channels on the tape at any given position of the tape. Since the code employed in the illustrative embodiment of the invention is a two-of-six code, it is obvious that when any number of data bit signals other than two is generated at any given position of the tape, an error has been made, either in perforation of the tape, or in reading. In the language checking circuit, the number of data bit signals produced at each character position of the tape is ascertained, and a signal which varies according to whether or not the correct number of data bits is present is combined in a gating circuit with a timing pulse produced by the clock circuit to develop an error signal in the event that an incorrect number of data bits are present. This error signal may be applied to the utilizing device to initiate a lock-up or other action, or it may be otherwise employed, if desired.

With the foregoing in mind, an object of the present invention is to provide an apparatus for reading perforated tape or other media, which is fast and efficient in operation.

A further object is to provide a signal-checking device having means for producing an error signal in the event that an incorrect number of data bit signals are produced at any character position on the medium being sensed.

Another object is to provide tape-handling apparatus in which a clock signal and data bit signals are produced by sensing of the media being read, and in which a lack of coincidence between the clock signal and the required data bit signals will produce an error signal.

With these and incidental objects in view, the invention includes certain novel features of construction and combinations of parts, a preferred form or embodiment of which is hereinafter described with reference to the drawing which accompanies and forms a part of this specification.

One illustrative embodiment of means for checking for a coincidence of two data signals from a plurality of data reading circuits according to the present invention is shown in the drawing and will now be described. An error signal is developed by this means in the event that either more or less than two data signals are developed simultaneously by the data reading circuits.

An output signal $z$ of a reading circuit for each digit channel of a tape being read is applied to the language checking circuit for checking the correctness of the reading process. The signals $z$ are applied to the language checking circuit over a plurality of 680,000-ohm resistors 471, one for each data channel, which forms a resistor signal-mixing circuit.

This mixed signal, which may be composed of a data bit signal from each of the data reading channels, is fed over one-megohm resistors 472 and 473 to the control electrodes 474 and 475 of the two triode sections of a type 5965 duo-triode tube 476. When no bit signals are impressed on the circuit, the voltage on the electrodes 474 and 475 is approximately −60 volts. The voltage produced at these electrodes by the addition of each bit is approximately 40 volts for each bit of a six-bit code, such as is used in the illustrative embodiment of the invention.

The anode 477 of the left triode of tube 476 is connected over 100,000-ohm resistor 479 and lead 481 to a +200-volt D.C. terminal 482, and is also connected over resistors 496 and 497, of 820,000 ohms and 2.7 megohms, respectively, and lead 498 to a −300-volt D.C. terminal 499. When the left triode of the tube 476 is not conducting, the anode will be at about +186 volts, which voltage will become less positive when this triode conducts. Similarly, the anode 478 of the right triode of tube 476 is connected over a 100,000-ohm resistor 480 and the lead 481 to the +200-volt terminal 482 and is connected over resistors 509, 510, and 511, of 1 megohm, 2.2 megohms, and 200,000 ohms, respectively, and the lead 498 to the −300-volt D.C. terminal 499. When the right triode of the tube 476 is not conducting, the anode 478 will be at about +186 volts, which voltage will become less positive when this triode conducts.

Potential which is supplied to the cathodes 483 and 484 of the tube 476 is controlled by two sections of a type 5965 duo-triode tube 485. The tube 485 has its anodes connected over lead 481 to the +200-volt D.C. terminal 482 and has its cathodes connected over 15,000-ohm resistors 486 and 487 and lead 488 to the −100-volt D.C. terminal 489. The control electrode of the left-hand section is supplied with potential of about zero volts from a potential divider consisting of resistors 490 and 491, of 220,000 ohms and 110,000 ohms, respectively, connected between the leads 481 and 488. The control electrode of the right section is supplied with potential of about +43 volts from a potential divider consisting of resistors 492 and 493, of 220,000 ohms and 200,000 ohms, respectively, connected between the leads 481 and 488. The potentials thus applied to the control electrodes will cause the cathode of the left section of the tube 485 to be at slightly negative potential and the cathode of the right section to be about 43 volts more positive than that of the left section.

Since the cathodes 483 and 484 of the tube 476 are connected by leads 494 and 495 to the cathodes of the left and right sections, respectively, of tube 485, they will be at the same potential as those cathodes. The potentials thus applied to the cathodes 483 and 484 will bear such a relation to the potentials of their related control electrodes that the triodes will normally be biased to non-conduction, but the left section can be made to conduct when two data bit signals are simultaneously applied to their mixer network, and the right section can be made to conduct only when three or more data bit signals are simultaneously applied to the mixer network.

The left section of the tube 476 controls conduction in a signal-inverting tube 501. The control electrode 500 of the triode 501, which may be one half of a type 5965 tube, is connected between the resistors 496 and 497 in the anode circuit of the left section of the tube 476. The anode 502 of the tube 501 is connected over a 100,000-ohm resistor 503 and the lead 481 to the +200-volt D.C. terminal 482, and is also connected over a 680,000-ohm resistor 507 and a 2.2-megohm resistor 508 and the lead 498 to a −300-volt D.C. terminal 499. When the tube 501 is not conducting, the anode 502 will be at about +183 volts, which voltage will become less positive when this triode conducts. The cathode 504 of the tube 501 is connected over a lead 505 to a base reference potential which is shown as ground in the drawing.

The inverted signal from the tube 501 is applied to a tube 506, which may be of type 5915. The #1 control electrode of the tube 506 is connected between the resistors 507 and 508 in the anode circuit of the tube 501. The tube 506 is also controlled by the output signal of the right-hand triode section of the tube 476, which is fed directly from the anode 478 to the #3 control electrode of the tube 506, which electrode is connected between the resistors 509 and 510 in the anode circuit of the right section of the tube 476. The anode of the tube 506 is connected over a 38,000-ohm resistor 512 and the lead 481 to the +200-volt D.C. terminal 482, and is also connected over resistors 514 and 515, of 680,000 ohms and 2.2 megohms, respectively, and the lead 498 to the −300-volt D.C. terminal 499. The #2 and #4 control electrodes of the tube 506 are internally connected and then connected over a 10,000-ohm resistor 513 to the +200-volt D.C. terminal 482. The cathode and the #5 control electrode of the tube 506 are connected to the base reference potential shown as ground in the drawing.

The #1 control electrode of a tube 516, which may be of the gaseous type 5663, is connected between the resistors 514 and 515 over a one-megohm coupling resistor 517. The anode of the tube 516 is connected over a normally closed error reset switch 518, a 47,000-ohm resistor 519, and the lead 481 to the +200-volt D.C. terminal 482, and is also connected over a 680,000-ohm resistor 523 and a 2.2-megohm resistor 525 to the −300-volt D.C. terminal 499. The cathode of the tube 516 is connected over the lead 505 to ground, while the #2 control electrode of the tube 516 is connected over a one-megohm resistor 520 and a 330,000-ohm resistor 521 to the −300-volt D.C. terminal 499. An additional input carrying a language checking clock signal from point *j* of a clock circuit, such as that shown and described in the previously-cited parent application, Ser. No. 749,537, is coupled over a 68,000-ohm resistor 522 to the #2 control electrode circuit of the tube 516 between the resistors 520 and 521.

A circuit extends from between the resistors 523 and 525 in the anode circuit of the tube 516 to the control electrode of the left-hand section of a duo-triode tube 524, which may be of the type 5965. The anode of the left-hand section of the tube 524 is connected over a 100,000-ohm resistor 526 to a +100-volt D.C. terminal 527, and is also connected over a 270,000-ohm resistor 531 and a 2.2-megohm resistor 532 to the −100-volt D.C. terminal 489. When the left triode of the tube 524 is not conducting, its anode will be at about +92 volts, which voltage will become less positive when this triode conducts. The cathode of the left-hand section of the tube 524 is connected to ground.

The anode of the right-hand triode section of the tube 524 is connected to the +200-volt D.C. terminal 482, while the cathode of said right-hand section of the tube 524 is conencted over a 560,000-ohm resistor 528 in series with a 39,000-ohm resistor 529 to a −200-volt D.C. terminal 530. The control electrode of the right-hand section of the tube 524 is connected to the anode circuit of the left triode of said tube between the resistors 531 and 532.

The error signal output means 533 for the language checking circuit is taken off the cathode circuit of the right-hand section of the tube 524 between the cathode and the resistor 528. This error signal output means may be applied to a utilizing device, or may be otherwise employed.

The mode of operation of the language checking circuit will now be described. As has been stated, data bit signals from the various data-reading circuits are applied over the resistors 471 comprising a resistor signal mixing circuit and over the resistors 472 and 473 to the control electrodes 474 and 475 of the right and left-hand sections of the tube 476. The cathodes 483 and 484 of the tube 476 are supplied with potentials from the two sections of tube 485 of such values relative to the potentials on the control electrodes that the two sections of the tube 476 will be normally non-conducting. As has also been stated, the left-hand section of the tube 476 has its cathode at such a voltage that it will conduct if two or more data bit signals have been applied to the mixing network, while the right-hand section of the tube 476 has its cathode at such a voltage that it will conduct only if three or more data bit signals are present.

Let it first be assumed that less than two data bit signals are applied to the signal mixing network. In this case, as has been previously described, neither of the two sections of the tube 476 will be rendered conducting. Since no negative-going signal is applied from the anode 477 of the left-hand section of the tube 476 over the resistor 496 to the control electrode 500 of the tube 501, as would result if said section were rendered conducting by the application to the control electrode 474 of a signal corresponding to two or more data bits, the normal bias on the electrode 500 holds said tube in a conducting condition. The potential of the anode 502 of the tube 501 is therefore approximately +10 volts due to conduction in the tube, and due to the voltage-dividing network comprising resistors 507 and 508, the #1 electrode of the tube 506 remains at a negative value of potential which hold said tube in a non-conducting condition, regardless of the value of the potential on the #3 electrode of the tube 506, which electrode is coupled over the resistor 509 to the anode circuit of the right-hand section of the tube 476, which at this time is non-conducting and is supplying a positive potential to the #3 electrode of the tube 506.

When the tube 506 is cut off, its anode potential goes from slightly above ground to a more positive value. Since tube 506 is now cut off, this higher positive potential value appears on the #1 control electrode of the tube 516, which electrode is coupled to the anode circuit of the tube 506 over the resistors 514 and 517. The positive potential at the #1 electrode of the tube 516 is sufficient to prime said tube for firing, so that when the language check clock signal *j* is applied to the circuit over the resistor 522, and thence is applied to the #2 electrode of tube 516 over the resistor 520, the gaseous tube 516 will fire, thus causing a drop in the potential of its anode circuit.

This drop appears over the resistor 523 on the control electrode of the left-hand section of the tube 524 as a negative-going pulse, and causes said left-hand section to be cut off, said section being normally conducting, due to the normal bias on its control electrode. This in turn applies a positive-going signal from the anode circuit of the left-hand section of the tube 524 over the resistor 531 to the control electrode of the right-hand section of the tube 524. Said control electrode is normally biased to cut-off, so that this positive-going signal renders the tube conducting and causes the error signal output at the cathode of the right-hand section of the tube 524 to rise to a +50-volt "true" level for indication of the fact that an error has been detected in the bit outputs from the reader. As has been previously stated, this error output may be applied to the utilizing device to which the reader is coupled, or may be utilized in some other manner.

The error signal output will remain at the +50-volt "true" level until the tube 516 is extinguished, and this may be accomplished by opening the switch 518 in the anode circuit of the tube 516, thereby extinguishing said tube. This causes the potential level of the anode of said tube to rise, and thereby applies a positive-going signal over the resistor 523 to the control electrode of the left-hand section of the tube 524 to render said tube conducting. The resulting drop in anode potential of the left-hand section of the tube 524 causes the control electrode of the right-hand section of the tube 524 to be returned to its normal negative bias, thereby cutting off said right-hand section and dropping the voltage level of the error output signal on the cathode of said section to its negative "false" level.

In a manner similar to that described above, an error signal is also produced by the circuit when more than two data bit signals are applied coincidentally to the signal mixing network which includes the resistors 471. In this event, both the right and left-hand sections of the tube 476 will be rendered conducting, in a manner previously described. As has been stated, when the left-hand section of the tube 476 is in a conducting state, a positive normal bias voltage is applied to the #1 electrode of the tube 506, due to the fact that the tube 501 is cut off. However, a negative-going signal is applied to the #3 control electrode of the tube 506, due to the conduction of the right-hand section of the tube 476, and the consequent lowering of the anode potential of said section, which is effective, over the resistor 509, to lower the potential on the #3 control electrode of the tube 506. The #3 control electrode of the tube 506 is therefore effective to hold said tube in a non-conducting condition, which produces a potential level on the anode circuit of the tube 506, and on the #1 control electrode of the gaseous tube 516, sufficiently positive to prime the tube 516 for firing. Therefore, the next language check clock signal *j* applied over the resistors 522 and 520 to the #2 control electrode of the tube 516 will be effective to fire said tube and thereby cause the error signal at the cathode of the right-hand section of the tube 524 to rise to the +50-volt "true" level and thus indicate an error in reading, in the manner previously described. Here again, the error reset switch 518 is effective to extinguish the tube 516 when desired, and thus return the error signal at the cathode of the right-hand section of the tube 524 to its "false" potential level.

Let it now be assumed that exactly two data bits are present, so that no error signal will be produced by the language checking circuit. In such a case, the left-hand triode section of the tube 476 will be conducting, while the right-hand section of said tube will not.

The resistance network comprising resistors 479, 496, and 497 provides a normal bias on the control electrode 500 of the tube 501 such that said tube is in a normally conducting state. When the left-hand section of the tube 476 is rendered conducting, a negative-going signal is supplied from the circuit of the anode 477 over the resistor 496 to the control electrode 500 of the tube 501, thus rendering said tube non-conducting. When the tube 501 is in a conducting state, its anode 502 is at a potential of approximately +10 volts. During this time, the first control electrode of the tube 506 is held at a negative potential, due to the voltage-dividing network comprising resistors 507 and 508, and said electrode therefore holds the tube 506 in a non-conducting condition. When the tube 501 is rendered non-conducting due to a negative-going signal being applied to its control electrode 500, the anode potential of the tube 501 rises, causing a positive-going signal to be applied to the first control electrode of the tube 506 to permit said tube to conduct. Since the right-hand section of the tube 476 has been stated to be non-conducting at this time, there will be a positive potential on the #3 control electrode of the tube 506, due to its normal bias, which electrode is coupled to the anode circuit of the right-hand section of the tube 476 over the resistor 509, and the tube 506 therefore will be in a conducting condition. So long as the tube 506 conducts, no error signal will be produced by the language checking network of the circuit, since no positive priming signal will be applied to the #1 control electrode of the tube 516, and the tube will not be fired, and the sections of the tube 524 will be ineffective to produce a positive signal on the error output signal means 533 in the manner previously described.

While the form of the invention shown and described herein is admirably adapted to fulfill the objects primarily stated, it is to be understood that it is not intended to confine the invention to the form or embodiment disclosed herein, for it is susceptible of embodiment in various other forms.

What is claimed is:

1. Signal checking means for checking the number of input signals coincidentally received thereby comprising, in combination, a plurality of individual signal input means, signal mixing means for establishing a voltage level in accordance with the number of signals applied coincidentally to the individual inputs; a control element controlled by the voltage level established by the signal mixing means and capable of producing a first control signal when said voltage level exceeds a predetermined minimum, and also capable of producing an additional control signal when said voltage level exceeds a different predetermined minimum; means for inverting said additional control signal; normally conducting gating means for combining the two control signals, said gating means being rendered non-conducting by a combination of the first control signal and the inverted anditional control signal, corresponding to any incorrect number of coincident input signals, to produce a further signal; and further gating means for combining the further signal with a timing pulse to produce an error signal indicating that an incorrect number of input signals have been simultaneously applied to the individual signal input means.

2. Signal checking means for checking the number of input signals coincidentally received thereby comprising, in combination, a plurality of individual signal input means, signal mixing means for establishing a voltage level in accordance with the number of signals applied coincidentally to the individaul input means; a control element controlled by the voltage level established by the signal mixing means and capable of producing a plurality of control signals which vary according to the number of signals applied to the individual signal input means; gating means for combining said plurality of control signals to produce a further signal; and a further gating means for combining the further signal with a timing pulse for producing an error signal when an incorrect number of input signals are simultaneously applied to the individual signal input means.

3. The signal checking means of claim 1, also including manually operable reset means for terminating the error signal.

4. Signal checking means for checking the number of input signals coincidentally received thereby comprising, in combination, a plurality of individual signal input means, signal mixing means for establishing a voltage level in accordance with the number of signals applied coincidentally to the individual input means; a control element controlled by the voltage level established by the signal mixing means and capable of producing a plurality of control signals which vary according to the number of signals applied to the individual signal input means; gating means for combining said plurality of control signals; and signal output means controlled by said gating means to produce an error signal when an incorrect number of input signals are simultaneously applied to the individual signal input means.

5. The signal checking means of claim 4, also including reset means for terminating the error signal.

References Cited

UNITED STATES PATENTS 2,688,050 8/1954 Harris ---------- 340—146.1 X

MALCOLM A. MORRISON, *Primary Examiner.*

M. J. SPIVAK, *Examiner.*